United States Patent [19]

Jain

[11] Patent Number: 5,053,946
[45] Date of Patent: Oct. 1, 1991

[54] TOKEN RING NETWORK HAVING TOKEN REQUEST MECHANISM

[75] Inventor: Rajendra K. Jain, Sudbury, Mass.

[73] Assignee: Digital Equipment Corporation, Maynard, Mass.

[21] Appl. No.: 519,313

[22] Filed: May 7, 1990

Related U.S. Application Data

[63] Continuation of Ser. No. 198,993, May 26, 1988, abandoned.

[51] Int. Cl.$^5$ ............... H04B 14/00; G06F 13/00
[52] U.S. Cl. .................. 364/200; 364/229.3; 364/241.8
[58] Field of Search ... 364/200 MS File, 900 MS File; 340/825.05

[56] References Cited

U.S. PATENT DOCUMENTS

| | | | |
|---|---|---|---|
| 4,506,360 | 3/1985 | Kryskow et al. | 370/85.4 |
| 4,566,098 | 1/1986 | Gammage et al. | 340/825.05 |
| 4,627,051 | 12/1986 | Shimizu | 370/85.5 |
| 4,675,671 | 6/1987 | Ishizuka et al. | 340/825.05 |
| 4,736,368 | 4/1988 | Szczepanek | 340/825.05 |
| 4,819,229 | 4/1989 | Pritty | 370/85.5 |

FOREIGN PATENT DOCUMENTS 171150  10/1983  Japan .

OTHER PUBLICATIONS

*Data Communications*, Nov. 1987, pp. 147–159 "Is there an OSI Session Protocol in Your Future", by Stallings.
*Data and Computer Communications*, by Stallings, 1985, pp. 144–161, 178 & 179.
A Microprocessor-Based Controller for a Loop Switching System by Anderson et al., *IEEE ICC* 1978, pp. 24.4, 1–6.

*Primary Examiner*—Lawrence E. Anderson
*Attorney, Agent, or Firm*—Cesari & McKenna

[57] ABSTRACT

A token ring network includes a plurality of stations interconnected to transmit frames containing information. A station may originate a frame transmission if it has information to transmit and if it is holding a token. A frame includes the information and a token request flag initialized to a selected condition. While one station is originating transmission of the frame around the network, if another station needs to transmit a frame, that station conditions the token request flag to another predetermined condition. The originating station receives the frame and examines the token request flag. If the token request flag has the predetermined condition, it transmits the token over the network to permit another station to originate a frame transmission. Thus, unless another station needs to transmit a frame, as indicated to the originating station by the condition of the token request flag, the originating station may continue to transmit, and so the time an originating station may transmit is not limited to any arbitrary time period.

11 Claims, 5 Drawing Sheets

TOKEN RING NETWORK HAVING TOKEN REQUEST MECHANISM

This application is a continuation application of U.S. application Ser. No. 07/198,993 filed 5/26/88 now abandoned.

BACKGROUND OF THE INVENTION

1. Field of the Invention

The invention relates generally to the field of computer networks and more specifically to a network comprising a plurality of stations which transmit data using a token-based protocol.

2. Description of the Prior Art

Computer networks enable various devices, such as processors, mass storage devices, and printers, to communicate with each other over high speed communication links. The devices, through interfaces, transmit and receive information in the form of frames transmitted over the communications links. The devices and their associated interfaces together are identified as stations. The stations operate in accordance with communication protocols which facilitate the orderly transfer of frames over the communication links.

One typical type of communication protocol is a token-ring system. In a token-ring system the stations are connected in a ring. Each station receives information frames over the communications link from one station and transmits frames over the communications link to another station in the network. If a station holds a token, it may originate a frame, transmitting it to another station in the network. Each of the other stations repeats the frame around the ring until it reaches the originating station. The station that is the intended recipient of the frame also copies the frame for processing.

The token is a coded information frame which is transferred around the network from station to station over the communications link. If a station needs to transfer a frame, when it receives the token from one station, it does not then transmit it to the next station in the network, effectively capturing the token. The capturing station then begins a frame transmission over the communications link. When the station is finished with the frame transmission, it transmits the token over the communications link to the next station, effectively releasing it. The stations thereafter transfer the token around the network until a station captures it.

The stations must follow predetermined network protocol rules for capturing, holding and releasing the token. One widely used token-ring protocol is the Fiber-Distributed Data Interface (FDDI) developed by the American National Standard Institute, Inc. The FDDI protocol, like many of the other token-ring protocols, establishes various time limits for capturing the token, holding it, and releasing it. For example, when a station captures the token it can hold the token, and thus transfer a frame, only for a predetermined amount of time. At the expiration of this holding time, the station must release the token, allowing the other stations on the network an opportunity to capture it. This ensures that no station monopolizes transmissions over the network. However, the station must release the token even if it has not yet completed transferring all of the information it has to transmit and even if no other station needs to perform a transfer. If no other station needs to perform a transfer, the released token will not be captured as it is being transferred around the network, and at the point the station again captures the token it may resume transmitting, but the network will have been idle while the token was being transferred.

SUMMARY OF THE INVENTION

The invention provides a new and improved station for transmitting and receiving frames in a token-ring network, and a method for controlling transmissions of frames over the network.

In brief summary, a station in a network, if it is holding the token and has information to transmit, originates the transmission of a frame including the information and a token request flag initialized to a selected condition. During transmission of the frame around the network, if another station has information to transmit, that station conditions the token request flag to another predetermined condition. When the originating station receives the frame, it examines the token request flag. If the token request flag has the predetermined condition, the station transmits the token over the network. Unless another station needs to transmit a frame, as indicated to the originating station by the condition of the token request flag, the originating station may continue to transmit.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
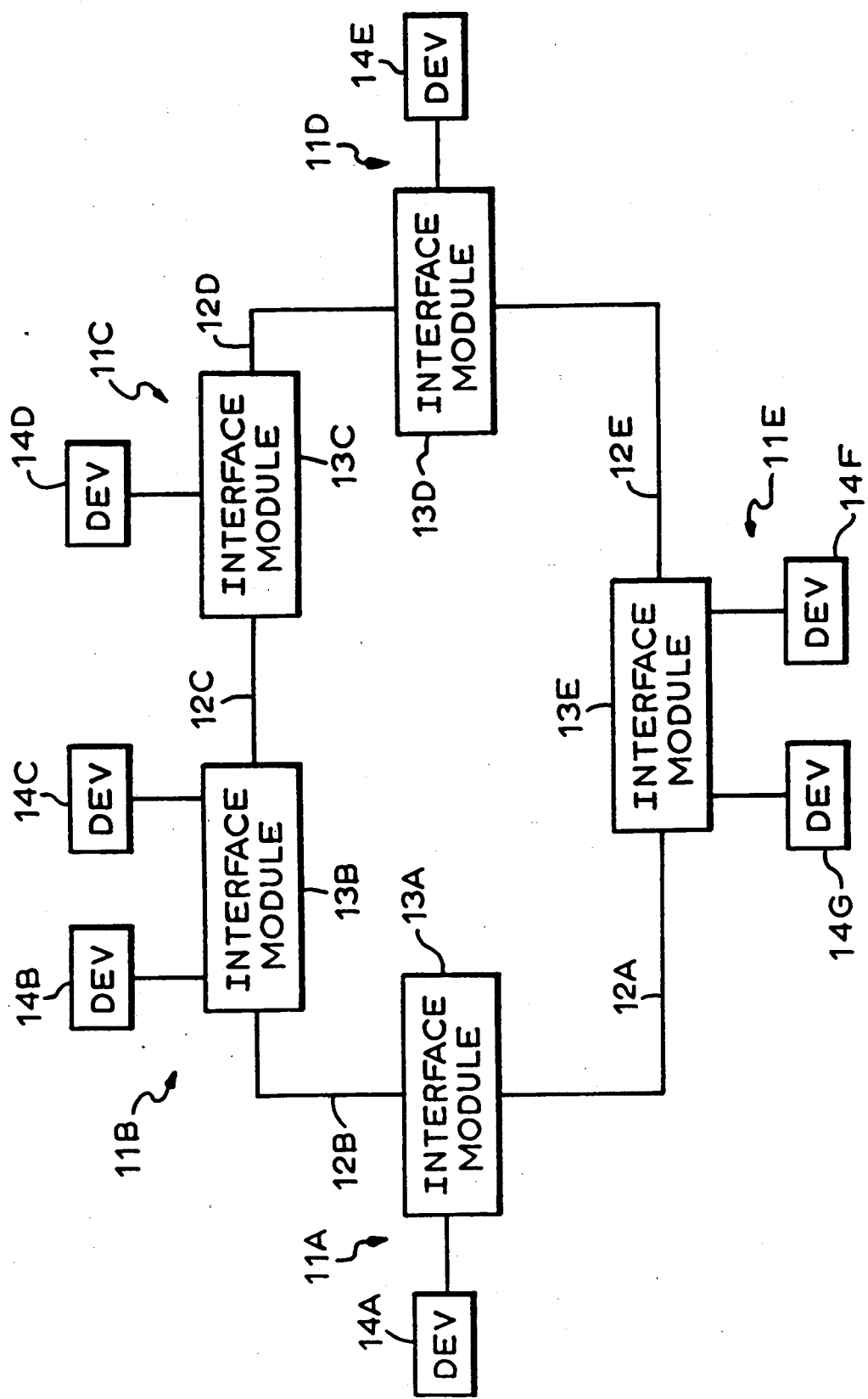
FIG. 1 depicts a functional block diagram of a computer network.

With reference to FIG. 1, a computer network 10 includes a plurality of stations 11A through 11N (generally identified by reference numeral 11) interconnected by communication links 12A through 12N (generally identified by reference numeral 12). Each station 11 includes an interface module 13A through 13N (generally identified by reference numeral 13) and one or more devices 14A through 14M (generally identified by reference numeral 14). The devices 14 may be of diverse types, including computers, mass storage devices, telecommunications links, printers, and so forth, all of which may need to transmit information to, or receive information from, other devices in the network 10 over communication links 12.

The stations, and specifically, the interface modules 13 transmit information over the respective communications links 12 in the form of frames, the structure of which will be described below in connection with FIG. 2. At any given time, one station 11, and in particular its interface module 13, may be transmitting a frame to another station 11. To accomplish this, the interface module 13 of station 11 originating the frame transmits a signal comprising a bit stream forming the frame to another interface module 13 over the communications link 12 interconnecting the two stations. The interface module 13 that receives a bit stream from the originating interface module 13 repeats the frame over the communications link 12 interconnecting it and another interface module 13.

This process is repeated by each of the other interface modules 13 until the frame is returned to the originating interface module 13. Essentially, each of the interface modules 13 receives a signal over a communications link 12 interconnecting it and an upstream interface module 13, and transmits a signal over another communications link 12 interconnecting it and a downstream interface module 13, to thereby define a ring. If an interface module 13 is in the station 11 that is the intended recipient of the frame, in addition to repeating the frame to its downstream interface module 13, it also retains a copy of the frame for processing by one or more of the devices 14 connected to it.

The determination of whether a station's interface module 13 may originate a frame is based on whether it holds a token. A token is a bit stream comprising a predetermined series of bits which the interface modules 13 transmit around the network. If an interface module 13 needs to send a frame, when the token reaches it, it stops transmission of the token, thereby becoming the token holder, and transmits the frame. After transmitting the frame, the interface module 13 resumes transmission of the token around the network, effectively releasing it to other stations in the network 10.

Figure 2:
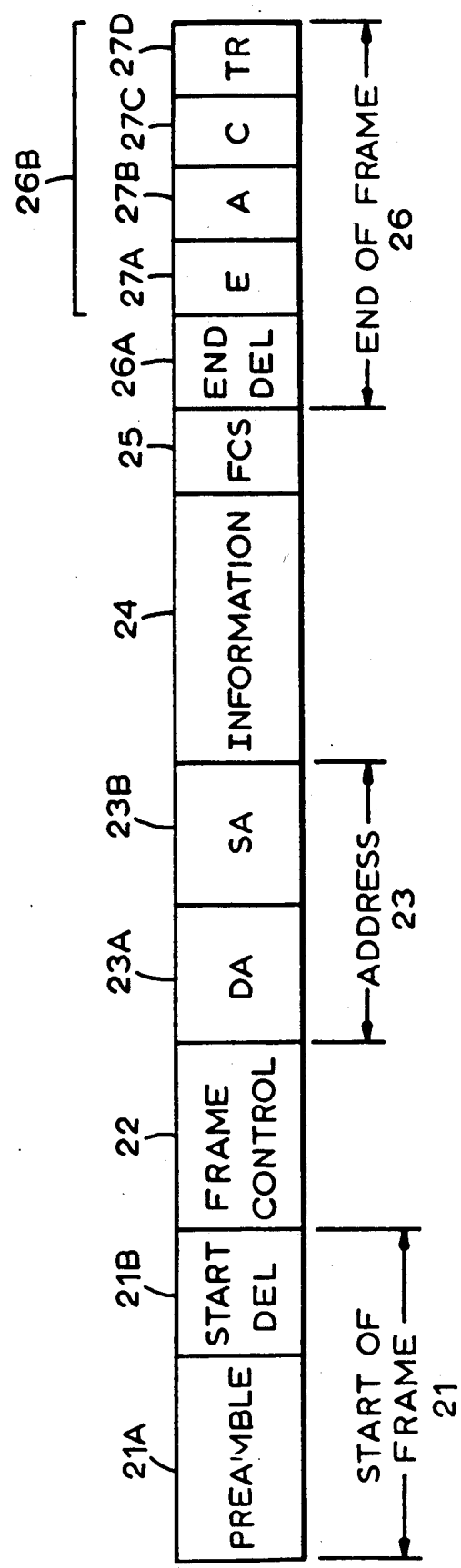
FIG. 2 depicts an illustration of an information frame used in the computer network shown in FIG. 1.

As noted above, information is transferred in the form of frames, the structure of which is shown in FIG. 2. With reference to FIG. 2, a frame 20 is divided into several fields. The start of a frame is denoted by a preamble field 21A and a start frame delimiter field 21B which further denotes the beginning of the portion of the frame containing the frame information. These fields are generally referred to as a start of frame sequence 21. Immediately following the start of frame sequence 21 is a frame control field 22 detailing the type of frame 20, that is, whether the frame is, for example, a token frame or a data frame. The next two fields are address fields 23A-B, namely, a destination address field DA 23A whose contents identify the station intended to receive the frame and a source address field SA 23B whose contents identify the originating station. The information field 24 follows the addresses 23, and is in turn followed by a frame check sequence field 25 which is used by the stations 11 to determine whether there is an error in any of the frame control field 22, the address fields 23 and/or the information field 24. The end of the frame is denoted by an end of frame sequence 26 which includes an end delimiter field 26A, which defines the end of a frame, and a frame status flag field 26B containing a set of status flags which are conditioned by stations 11 other than the originating station 11 to provide status information to the originating station 11.

The FDDI protocol defines three status flags, namely, an error detected flag 27A, an address recognized flag 27B, and a frame copied flag 27C. The originating interface module 13 initializes all three flags 27A through 27C to a "Reset" condition when it transmits a frame. Thereafter, any interface module 13 which detects an error in the frame sets the error detected flag 27A. When the frame is returned to the originating interface module 13 with the flag 27A set, it may take error recovery operations to recover from the error.

If an interface module 13 recognizes the contents of the destination address field DA 23A as its own address in a frame with the error detected flag 27A reset, it sets the address recognized flag 27B. Thus, when the frame has been transmitted around the network 10 and returned to the originating interface module 13, it will be able to determine from the condition of the address recognized flag 27B whether the contents of the destination address field identify any of the other stations 11 in the network 10.

The interface module 13 identified by the contents of the destination address field DA is the intended recipient of the frame, and so, as noted above, it proceeds to copy the frame for processing by its attached device 14. If it completes copying the frame without any problems, which may require the originating interface module 13 to repeat the frame several times, it sets the frame copied flag 27C. When the originating interface module 13 receives a returned frame in which the error detected flag 27A is reset and both the address recognized flag 27B and the frame copied flag 27C are set, it has successfully communicated the frame and it may remove the frame from the network 10. If any one of the three flags 27A-C is not in the desired condition, the originating module 13 may take a recovery action, such as re-transmitting the frame one or more times or it may simply inform a protocol user.

In accordance with the invention, a frame 20 further includes, as an additional frame status flag, a token request flag 27D. The originating interface module 13, in transmitting a frame 20, initializes the token request flag 27D to a reset condition, and an interface module 13 which has information ready to transfer thereafter conditions the token request flag 27D to the set condition. The set token request flag 27D, when received by the originating interface module 13, is notified thereby that another interface module 13 has information to transfer, and so it thereafter releases the token.

Generally, when an originating interface module 13, which is holding the token, receives a frame 20 in which the token request flag 27D is set, it follows one or more protocol rules for releasing the token. The protocol rules may require either that the holding interface module 13 release the token immediately or after a predetermined time after receipt of the set token request flag 27D. Alternatively, the protocol rules may permit the holding interface module 13 to retain the token until it has received notification of the successful receipt of the frame it is then transmitting, by its receipt of the frame containing a reset error detected flag 27A, a set address recognized flag 27A and a set frame copied flag 27C.

It will be appreciated that the token request flag 27D permits the various interface modules 13 to coordinate transmissions of information around the network 10, while minimizing idle time possible with the prior FDDI protocol. The condition of the token request flag 27D notifies the interface module 13 that is holding the token whether or not another interface module 13 has information to transmit, and so the holding interface module 13 need not release the token, while it has information to transfer, unless the token request flag 27D has been set. The amount of time a interface module 13 holding the token can transmit thus need not be limited by any arbitrary time limit.

It will further be appreciated that it may be desirable to limit the length of a frame 20 that an originating interface module 13 may transmit, as is effectively accomplished by the frame length limits in the prior FDDI protocol noted above, but further to condition release of the token on the condition of the token request flag 27D. Thus, an interface module 13 holding the token may transmit its information in a plurality of sequentially-transmitted frames, each of which ends in a token request flag 27D, without releasing the token unless it receives a set token request flag 27D. This would ensure that no station 11 could monopolize frame origination, thereby accomplishing the same result as the time limitations in the FDDI protocol, but without introducing the network idle time possible with the FDDI protocol.

Figure 3A:
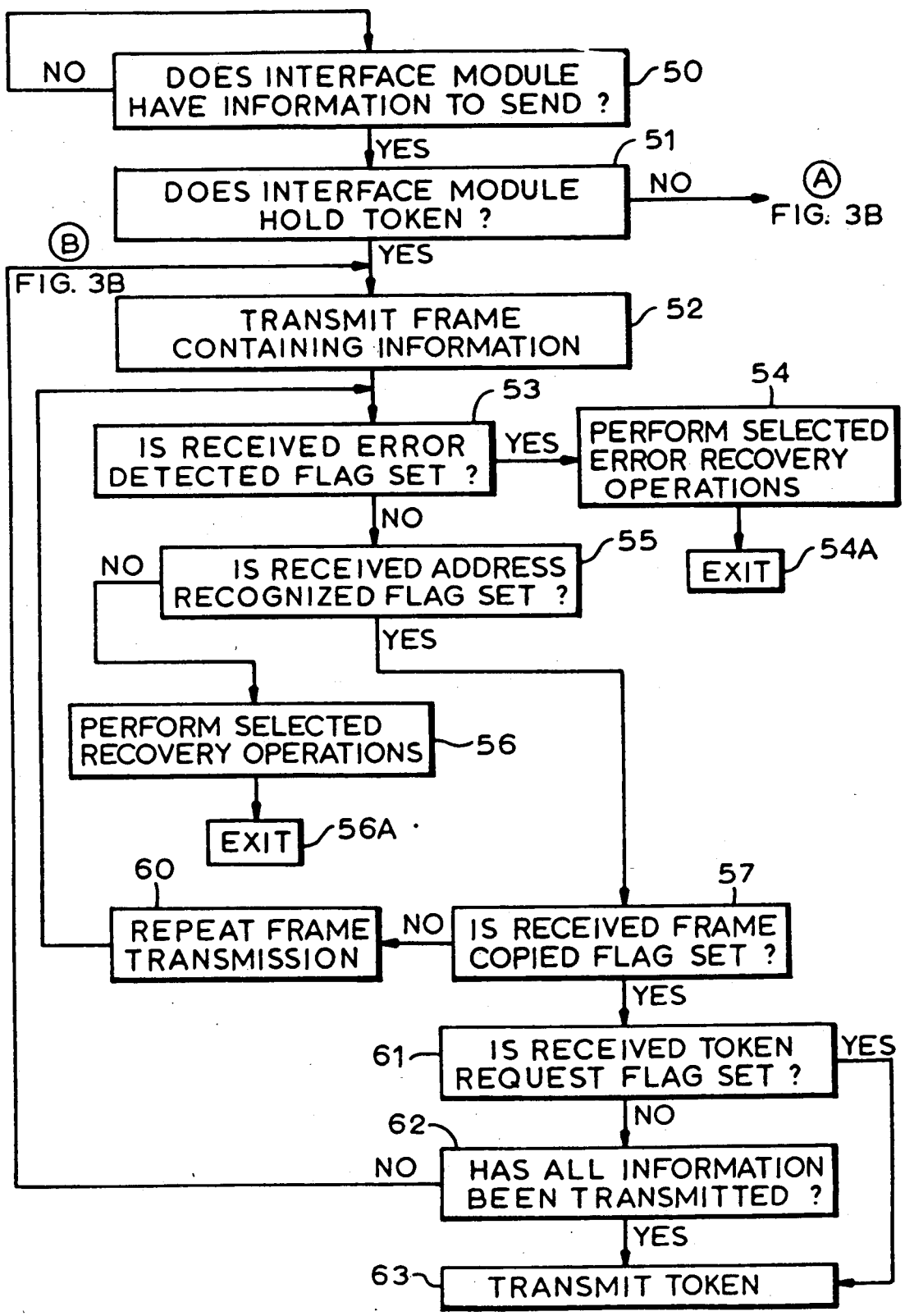
FIGS. 3A and 3B together comprise a flow chart depicting the operations of a station on the computer network shown in FIG. 1 operating in accordance with the preferred embodiment.
Figure 3B:
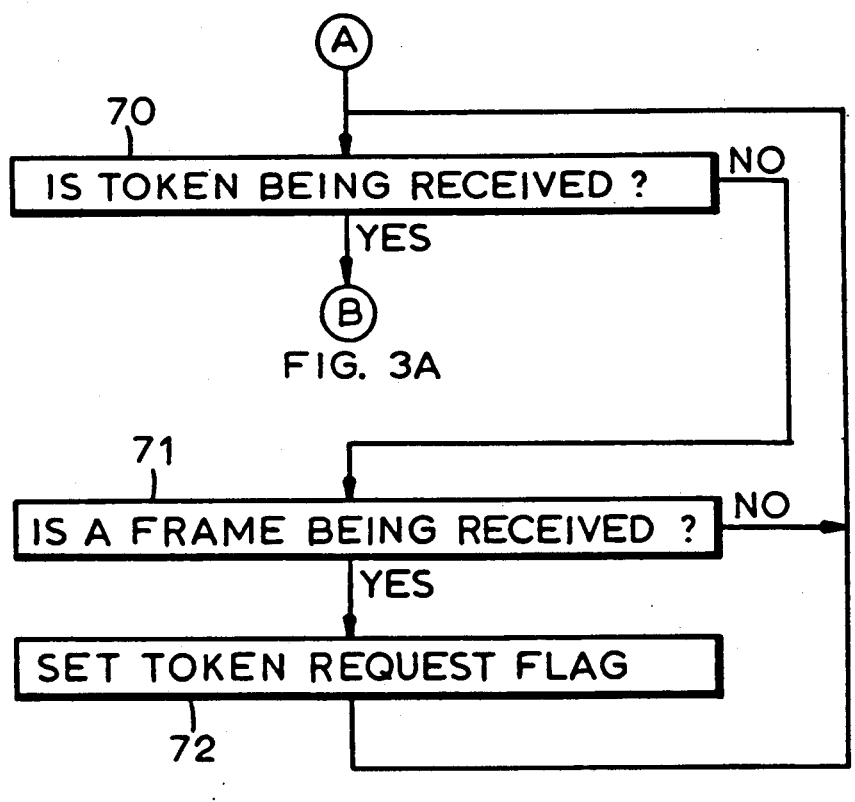

The detailed operations performed by an interface module 13 constructed in accordance with the invention will be described in connection with FIGS. 3A and 3B. With reference to FIG. 3A, when the interface module 13 has information to transmit to another station in the network (step 50), it determines whether it is holding the token (step 51). If the interface module 13 is not holding the token, it steps to a sequence depicted on FIG. 3B to receive the token. Initially in that sequence, the interface module 13 determines whether it is receiving the token (step 70). If not, it determines whether it is receiving a frame (step 71). If so, it sets the token request flag 27D (FIG. 2) in the frame (step 72). Following step 72, or step 71 if the interface module 13 is not receiving a frame, it returns to step 70. The interface module 13 repeats steps 70 through 72 until it determines, in step 70, that it has received the token.

When the interface module 13 determines, in step 70 that it has received the token, it transmits a frame containing information (step 52, FIG. 3A) over the communications link 12 connecting it to its downstream interface module. As it is transmitting the frame, the interface module monitors the frame as it is being received over the communications link 12 connecting it to its upstream communications module, specifically to determine the conditions of the various flags 27A through 27D as conditioned by the other interface modules in the network 10. If the interface module 13 determines, for example, that the error detected flag 27A is set, indicating an interface module 13 has recognized an error in the frame (step 53), it may perform selected error recovery operations (step 54) and then exit (step 54A). If the address recognized flag 27B is not set, indicating that the contents of the frame's destination address field DA was not recognized by an interface module 13 (step 55), it may perform selected recovery operations (step 56) such as retransmitting the frame a selected number of times, and then exit, notifying an operator (step 56A).

If, on the other hand, the interface module 13 determines that the error detected flag is reset (step 53) and the address recognized flag 27B flag is set (step 55), either in connection with the first transmission of the frame or a subsequent transmission, it then determines the condition of the frame copied flag 27C (step 57). If the copy flag is not set, the intended recipient interface module, which was identified by the contents of the destination address field DA, has not yet copied the frame for processing, and so the interface module 13 repeats the frame transmission (step 60) and returns to step 53 to permit checking of the various flags 27A through 27C.

If, in step 57, the interface module 13 determines that the frame copied flag 27C is set, indicating that the interface module has received and copied the frame without any problems, it sequences to step 61, in which it determines the condition of the received token request flag 27D. If the token request flag 27D is not set, and if the previously transmitted frame did not exhaust all of the information to be transmitted (step 62), the interface module returns to step 52 to transmit another frame. On the other hand, if the interface module 13 determined in step 61 that the token request flag was set, or in step 62 that it had no further information to transmit, it sequences to step 63 in which it transmits the token, permitting other interface modules 13 to capture the token and perform a frame transmission.

In the prior FDDI protocol, if a token is not seen by an interface module within a predetermined time a station may start a recovery operation such as re-initializing the ring. It will be appreciated that if the token request flag mechanism is used, the recovery operation will be triggered by the token not being seen by a station within a predetermined time after the setting of the token request flag 27D.

Frame transmissions around network 10 may be prioritized so that transmission of frames containing information of a higher priority may take precedence over transmission of frames containing information of lower priority. To accommodate frame prioritization, the frame status flags field 26B (FIG. 2) may contain a plurality of token request flags 27D, with each token request flag being associated with a priority level. If the originating interface module 13 receives a set token request flag 27D associated with a priority level equal to or greater than the priority level of the frame it is transmitting, it will thereafter release the token in accordance with a predetermined protocol. On the other hand, if the only set token request flags 27D are associated with priority levels of lower priority, the originating interface module 13 either will not release the token, or it may release the token in accordance with another protocol which may provide the originating interface module 13 with more time to transmit.

Transmissions may be classified based on the type of transfer involved, for example, interactive transfers or bulk file transfers may be in different classes. The various classes are commonly referred to as service classes. Multiple token request flags 27D may be used to establish the order of transmissions based on network conditions and the service classes of the transfers. For example, a transmission involving interactive communication may be in a service class requiring immediate transmission, while a transmission involving transferring bulk files may be in a service class requiring transmission only at a time when the network is free of interactive communications. Thus each service class will have its own token request flag 27D, which will operate similarly to the priority token request flags 27D described above.

The token request flag 27D also enables two stations 11 to continuously communicate with each other and transfer large amounts of information without the necessity of having restricted tokens as in the FDDI protocol. Restricted tokens, in effect, restrict access to the network by any stations except the two communicating stations, regardless of the transmission needs of the other stations. Using the token request flag 27D, however, enables two stations 11 to communicate over the network, operating in an "uninterrupted mode" as long as no other station 11 needs to engage in a transfer. Thus the two stations 11 can operate indefinitely without interruption. On the other hand, when another station 11 needs to engage in an information transfer, it sets the token request flag 27D. Thereafter the uninterrupted operation will cease. If one of the two communicating stations 11 later captures the token and there are no outstanding requests for the token, the uninterrupted operation can resume. Thus, unlike the FDDI protocol, the token request flag 27D permits uninterrupted operation to be achieved without "cutting-off" the other stations on the network.

The token request flag 27D also facilitates full-duplex operation between either two stations 11 on the same network or two stations 11 on two different networks interconnected by one or more bridges (FIG. 4) that effectively operate as stations 11 on each of the networks. The inter-network full-duplex operation is described with respect to FIG. 4 below.

Two stations on the same network can begin full-duplex operation when one of the two stations 11 captures the token. The token-capturing station 11 transmits frames to the second station 11, which then transmits its own frames back to the capturing station instead of repeating the received frames. The second transmitting station 11 may, depending on the protocol rules, set the status flags in the transmitted frame to indicate the status of the previously received frame. For example, if an error is detected in the frame sent by the token-capturing station 11 the second station 11 may set the error detected flag 27A in the frame it transmits. This will inform the capturing station 11 that the earlier frame contained an error. When another station needs to do a transfer, it sets the token request flag 27D and the full-duplex operation stops until one of the two stations again captures the token and no other station requests it.

Figure 4:
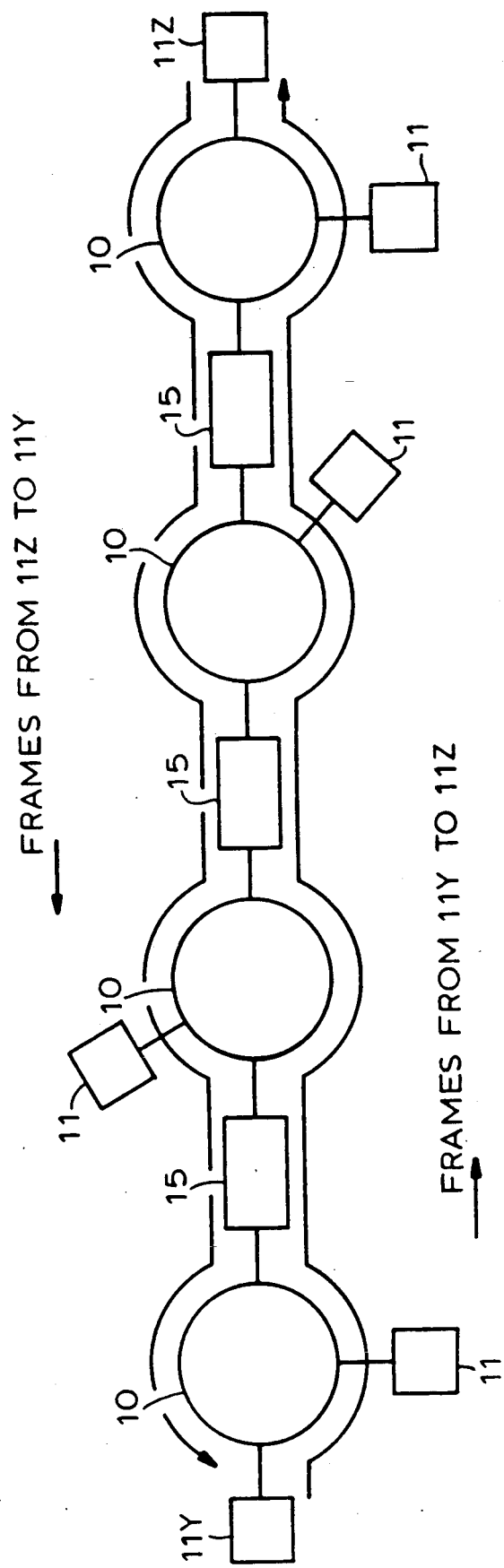
FIG. 4 depicts a series of computer networks interconnected by bridges.

With reference to FIG. 4, two stations 11Y-Z are on different networks 10 inter-connected by one or more bridges 15. The two stations 11Y-Z can communicate in full-duplex mode if they and all the bridges 15 between them are holding the tokens associated with their respective networks 10. The tokens permit the stations to communicate through the bridges 15, which pass all frames between the two stations 11. This full-duplex mode of operation can continue until any of the two stations 11Y-Z or an intervening bridge 15 receives a set token request flag 27D.

The foregoing description has been limited to a specific embodiment of this invention. It will be apparent, however, that variations and modifications may be made to the invention with the attainment of some or all of the advantages of the invention. In particular it will be apparent that the invention may be used with protocols other than the FDDI protocol. Therefore, it is the object of the appended claims to cover all such variations and modifications as come within the true spirit and scope of the invention.

What is claimed as new and desired to be secured by Letters Patent of the United States is:

1. A station for transmitting and receiving information in the form of frames over a token ring network operating in accordance with a token ring protocol, said station comprising:
   A. token capturing means for capturing and holding a token, said token being held while data is transmitted;
   B. frame transmitting means for transmitting, in response to the capture of the token, a data frame containing (1) the message to be transmitted (2) addresses and frame status flags required by the token ring protocol, and (3) a token request flag having first and second conditions, said frame transmitting means transmitting said token request flag in said first condition;
   C. frame receiving means for receiving data frames transmitted over the network and examining the condition of the token request flag in each of the received data frames to determine if said token request flag is in said second condition; and
   D. token transmitting means for transmitting the token held by the token capturing means, in response to the reception of a data frame containing a token request flag in said second condition; wherein said frame transmitting means continues to transmit data frames until either the transmission is complete or said token transmitting means transmits the token, whereby each message is accompanied by a token request flag such that the token may be held by a transmitting station until a token request flag indicates another station requests the token.

2. A station as defined in claim 1, the station further comprising:
   A. token request flag conditioning means for selectively setting said token request flag in a received frame to said second condition if (i) said frame transmitting means has information to transmit, and (ii) said token capturing means is not holding the token; and
   B. frame transfer means for repeating said received frame over the network; whereby said token request flag conditioning means sets said token request flag in said received frame to said second condition before said frame transfer means repeats said received frame.

3. A station as defined in claim 2, wherein said token request flag conditioning means alters to said second condition the condition of said token request flags in every frame received by said frame receiving means if the frame transmitting means has information to transmit and the token capturing means is not holding the token.

4. A station for transmitting and receiving information in the form of frames over a token ring network operating in accordance with a token ring protocol, said station comprising:
   A. token capturing means for capturing and holding a token, said token being held while data is transmitted;
   B. transmission priority indication means for indicating the priority of the information the station holds for transmission, if the information is associated with a priority;
   C. frame transmission means for transmitting, in response to the capture of a token, a data frame containing (1) the message to be transmitted, (2) addresses and frame status flags required by the token ring protocol, and (3) a plurality of token request flags each having first and second conditions, said frame transmission means transmitting said token request flags in said first condition;
   D. frame receiving means for receiving a data frame and examining the condition of each of said token request flags in the received data frame to determine if any of said token request flags are in said second condition; and
   E. token transmission means for transmitting the token in response to the reception of a data frame with at least one token request flag which corresponds to a higher priority than the transmission priority indicated by said transmission priority means set in said second condition; wherein said frame transmitting means continues to transmit data frames until either the transmission is complete or said token transmitting means transmits the token, whereby each message is accompanied by token request flags such that the token may be held by a transmitting station until a token request flag of equal or higher priority indicates another station requests the token.

5. A station as defined in claim 4, said station further comprising:
  A. token request flag conditioning means, responsive to the reception of a frame while said token indication means indicates that it is not holding a token and further responsive to the presence of information to transmit, said token request flag conditioning means conditioning to said second condition the token request flag in the received frame corresponding to the transmission priority indicated by said transmission priority indication means; and
  B. frame repeating means for repeating the frame over the network.

6. A station as defined in claim 5 further comprising full-duplex operating means, responsive to the capture of a token, said full-duplex means indicating the status of a previously received frame using a next transmitted frame.

7. A station as defined in claim 5, wherein said token request flag conditioning means conditions in every frame received by said frame receiving means said token request flags having the same priority as information held for transmission if the frame transmitting means has information to transmit and the token capturing means is not holding the token.

8. A token ring network for transmitting and receiving information in the form of frames, said network including a plurality of stations, wherein said stations include:
  A. token capturing means for capturing and holding a token, said token being held while data is transmitted;
  B. frame transmitting means for transmitting, in response to the capture of the token, data frames containing (1) the message to be transmitted, (2) addresses and frame status flags required by the token ring protocol, and (3) a token request flag having first and second conditions, said frame transmitting means transmitting said token request flag in said first condition;
  C. frame receiving means for receiving a data frame transmitted over the network and examining the condition of the token request flag in the received data frame to determine is said token request flag is in said second condition; and
  D. token transmitting means for transmitting the token held by the token capturing means in response to said frame receiving means receiving a data frame containing a token request flag in said second condition; wherein said frame transmitting means continues to transmit data frames until either the transmission is complete or said token transmitting means transmits the token, whereby each message is accompanied by a token request flag such that the token may be held by a transmitting station until a token request flag indicates another station requests the token.

9. The system of claim 8, wherein said frame receiving means includes frame transfer means for repeating over the network a received frame when said token capturing means is not holding a token, said frame transfer means setting the token request flag in the received frame to the second condition before repeating the frame if said station has information ready to transmit.

10. A token ring network for transmitting and receiving information in the form of a frame, said network including a plurality of stations, wherein said stations include:
  A. token capturing means for capturing and holding a token, said token being held while data is transmitted;
  B. frame transmitting means for transmitting, in response to the capture of the token, a data frame containing (1) the message to be transmitted, (2) addresses and frame status flags required by the token ring protocol, and (3) a plurality of token request flags having first and second conditions, each of which corresponds to a different transmission priority, said frame transmitting means transmitting each of said token request flags in said first condition;
  C. frame receiving means for receiving a data frame transmitted over the network and examining the condition of each of said token request flags in the received data frame to determine if said token request flags are in said second condition; and
  D. token transmitting means for transmitting the token held by the token capturing means in response to said frame receiving means receiving a data frame containing a token request flag in said second condition which corresponds to a higher priority than the information which said station is then transmitting; wherein said frame transmitting means continues to transmit data frames until either the transmission is complete or said token transmitting means transmits the token, whereby each message is accompanied by token request flags such that the token may be held by a transmitting station until a token request flag of equal or higher priority indicates another station requests the token.

11. The system of claim 10, wherein said frame receiving means includes frame transfer means for repeating received frames over the network when said token capturing means is not holding a token, wherein, if said station has information to transmit, said frame transfer means, before repeating the received frame sets to the second condition the token request flag which corresponds to the priority of the information ready to transmit.

* * * * *